(12) United States Patent
Gaudig

(10) Patent No.: US 9,637,060 B2
(45) Date of Patent: May 2, 2017

(54) CLOSABLE DEVICE FOR HOLDING OBJECTS IN A VEHICLE

(71) Applicant: GM GLOBAL TECHNOLOGY OPERATIONS LLC, Detroit, MI (US)

(72) Inventor: Ralf Gaudig, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/546,629

(22) Filed: Nov. 18, 2014

(65) Prior Publication Data

US 2015/0137546 A1 May 21, 2015

(30) Foreign Application Priority Data

Nov. 18, 2013 (DE) .................. 10 2013 019 389

(51) Int. Cl.
| | |
|---|---|
| *B60R 13/00* | (2006.01) |
| *B60R 7/06* | (2006.01) |
| *E05D 7/02* | (2006.01) |
| *E05D 7/10* | (2006.01) |
| *B60R 7/04* | (2006.01) |
| *E05D 15/50* | (2006.01) |

(52) U.S. Cl.
CPC .............. *B60R 7/06* (2013.01); *B60R 7/04* (2013.01); *E05D 7/02* (2013.01); *E05D 7/1077* (2013.01); *E05D 15/505* (2013.01); *E05Y 2900/538* (2013.01)

(58) Field of Classification Search
CPC .... B60R 7/04; B60R 7/06; B60R 7/02; E05D 15/502

USPC ............................................ 296/24.34, 37.8
See application file for complete search history.

(56) References Cited

U.S. PATENT DOCUMENTS

| 3,505,480 A | 9/1893 | Pletcher et al. |
|---|---|---|
| 5,067,625 A | 11/1991 | Numata |
| 5,144,720 A | 9/1992 | Aihara et al. |
| (Continued) | | |

FOREIGN PATENT DOCUMENTS

| DE | 7613720 U1 | 9/1976 |
|---|---|---|
| DE | 3111595 A1 | 10/1982 |
| (Continued) | | |

OTHER PUBLICATIONS

Intellectual Property Office of Germany, Search Report dated Nov. 11, 2014 for DE 10 2013 019 389.3.

(Continued)

*Primary Examiner* — Pinel Romain
(74) *Attorney, Agent, or Firm* — Lorenz & Kopf, LLP.

(57) ABSTRACT

A closable device for holding objects in a vehicle, encompassing a base body and a cover, is provided. The base body exhibits an opening that can be closed by the cover, and the cover can be swiveled around a first hinge from a first position into a second position and vice versa. The cover can be swiveled around a second hinge from the first position into a third position and vice versa. The base body encompasses at least one first bearing for the first hinge, and at least one second bearing for the second hinge. The first hinge and the second hinge each exhibit at least one first hinge section and at least one second hinge section, and a cross sectional area of the first hinge section is respectively larger than a cross sectional area of the second hinge section.

16 Claims, 9 Drawing Sheets

(56) References Cited

U.S. PATENT DOCUMENTS

| | | | | |
|---|---|---|---|---|
| 5,210,906 A * | 5/1993 | Aihara | ............. | B60R 7/04 16/232 |
| 5,357,652 A | 10/1994 | Yamada | | |
| 5,647,652 A * | 7/1997 | Zalewski | ............. | B60R 7/04 108/44 |
| 6,003,716 A * | 12/1999 | Allison | ............. | B60R 7/04 220/326 |
| 6,142,333 A | 11/2000 | Sasamoto et al. | | |
| 6,419,314 B1 * | 7/2002 | Scheerhorn | ............. | B60N 2/4646 296/37.8 |
| 6,835,891 B1 * | 12/2004 | Herzog | ............. | H02G 3/0418 174/135 |
| 7,192,070 B2 * | 3/2007 | Radu | ............. | B60N 2/4606 296/1.09 |
| 7,686,364 B2 * | 3/2010 | Hehn | ............. | B60R 7/04 220/812 |
| 7,810,862 B2 * | 10/2010 | Smith | ............. | B60R 7/04 220/817 |
| 8,100,453 B2 | 1/2012 | Shimajiri | | |
| 8,167,348 B2 * | 5/2012 | Fesenmyer | ............. | B60N 2/4606 296/1.09 |
| 8,523,260 B2 * | 9/2013 | Spitler | ............. | B60N 3/00 296/24.34 |
| 9,140,044 B2 | 9/2015 | Singh | | |
| 2002/0057002 A1 * | 5/2002 | Pegorier | ............. | B60R 7/04 296/37.8 |
| 2013/0270286 A1 * | 10/2013 | Fukui | ............. | B60R 7/04 220/811 |
| 2014/0361567 A1 * | 12/2014 | Singh | ............. | E05D 7/02 296/37.8 |

FOREIGN PATENT DOCUMENTS

| | | | | |
|---|---|---|---|---|
| IN | WO 2013190561 A1 * | 12/2013 | ......... | E05D 15/502 |
| JP | H03189249 A | 8/1991 | | |
| JP | H09317309 A | 12/1997 | | |
| WO | 2006037307 A1 | 4/2006 | | |

OTHER PUBLICATIONS

Great Britain Patent Office, Great Britain Search Report for Great Britain Application No. 1416828.0, dated Mar. 16, 2015.

\* cited by examiner

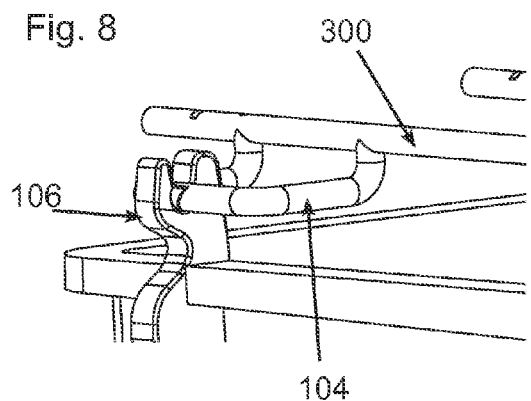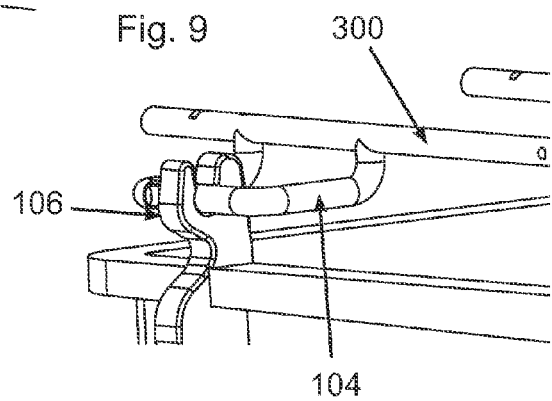

CLOSABLE DEVICE FOR HOLDING OBJECTS IN A VEHICLE

CROSS REFERENCE TO RELATED APPLICATION

This application claims priority to German Patent Application No. 10 2013 019 389.3, filed on Nov. 18, 2013, which is incorporated herein by reference in its entirety.

TECHNICAL FIELD

The technical field lies in the technical area of closable devices for holding objects in a vehicle.

BACKGROUND

EP 2 006 478 A2 describes a device with a base body and a cover that may be swiveled to two sides so as to uncover an opening of the base body. Control elements are provided for a user, with which the user may select the side toward which the cover is to be swiveled.

At least one disadvantage to this structural design involves the relatively complicated mechanics. This applies both to the mechanics of the swiveling mechanism and the mechanics of the control elements. This leads to a relatively complicated and cost-intensive manufacturing process. In addition, it may make it harder to repair the mechanics.

In addition, other objects, desirable features and characteristics will become apparent from the subsequent summary and detailed description, and the appended claims, taken in conjunction with the accompanying drawings and this background.

SUMMARY

By contrast, the various teachings of the present disclosure provide a device that makes production easier and less expensive.

According to the various teachings of the present disclosure, the device for holding objects in a vehicle encompasses a base body and a cover. The base body exhibits an opening that can be closed by the cover. The cover can be swiveled around a first hinge from a first position into a second position and vice versa. In addition, the cover can be swiveled around a second hinge from the first position into a third position and vice versa.

The base body encompasses at least one first bearing for the first hinge, and at least one second bearing for the second hinge. The first and second hinge each exhibit at least one first and at least one second hinge section. A cross sectional area of the first hinge section is here respectively larger than a cross sectional area of the second hinge section.

The differing cross sectional areas of the hinge sections are especially advantageous in making the mechanics behind the opening process simple. In the closed state, the respective first hinge section can be arranged in the bearing. A translational motion by the respective hinge allows the second hinge section to be moved at this location. The smaller cross sectional area makes it possible to remove the hinge from the bearing, so that the cover can be opened. For example, once the first hinge has been translationally moved in this way, the cover can be swiveled around the second hinge. The same holds true for the reverse case. If the cover is to be detached from the base body entirely, both hinges can be translationally moved.

For example, the device can be a center console in a vehicle between the front seats. When in the closed state, the cover can be used by an individual as an armrest. Objects can be stowed inside the housing. In this case, the device could also be referred to as a center console armrest.

In an embodiment of the present disclosure, the bearings can each exhibit a duct for the respective hinge. A cross sectional area of the duct can here correspond to the respective cross sectional area of the respective first hinge section. As a result of these features, the hinge is securely held by the bearing as the cover swivels around the respective hinge. A swiveling motion around the respective other hinge is prevented when the first hinge section is located in the bearing duct.

In an embodiment of the present disclosure, the respective cross sectional area of the second hinge section can be so small that the respective hinge can be removed from the bearing when the second hinge section is arranged in the bearing. In one example, this can mean that the hinge can be removed from the bearing in the direction in which the cover swivels. Once the second hinge section is situated in the duct, the cover can hence swivel, since the respective hinge is not held by the bearing.

In an embodiment of the present disclosure, the cover can exhibit at least one first and one second control element. The first control element can be allocated to the first hinge, and the second control element can be allocated to the second hinge. The respective control element can be used to translationally move the respective hinge from a first position into a second position and vice versa. The respective first hinge section can be arranged in the duct of the respective bearing in the first position. The respective second hinge section can be arranged in the duct of the respective bearing in the second position.

Therefore, the control elements allow the user to define which hinge is to be held by the bearings. If a hinge is translationally moved into the second position with a control element, the cover can swivel around the other hinge. If both hinges are translationally moved into the second position with the control elements, the cover can be completely separated from the base body. This yields a simple and cost-effective structural design for swiveling the cover in two directions.

It is also possible to electrically trigger the translational motion of the hinges. In such a case, the control elements could be designed as electrical switches that prompt an engine to translationally move the respective hinge.

In an embodiment of the present disclosure, the first and second hinge can run parallel to each other. This is advantageous when using the device between two vehicle seats. In this way, the device can be comfortably opened and closed from both sides.

In an embodiment of the present disclosure, the cover can close the opening in the first position, and uncover the opening in the second and third position.

In an embodiment of the present disclosure, the base body can exhibit at least one respective bearing for the first hinge, the second hinge, a third hinge and a fourth hinge. The first hinge and third hinge can define a first swiveling axis of the cover. The second and fourth hinge can define a second swiveling axis of the cover. The hinges can be held by the respective bearings. When the cover pivots around the first swiveling axis, the cover is moved from the first position into the second position or vice versa. When the cover is pivoted around the second swiveling axis, the cover is moved from the first position into the third position or vice versa. The use of two hinges per swiveling axis is advantageous for the stability of the device.

In an embodiment of the present disclosure, the first and third hinge can be mechanically joined together. In addition, the second and fourth hinge can be mechanically joined together. For example, this can be done by mechanically joining the respective hinges together via a rod-shaped connecting element. The translational motion of the respective hinges can then be triggered by the rod-shaped connecting element. For example, the rod-shaped connecting element can be mechanically joined with the respective control element.

In an embodiment of the present disclosure, each of the hinges can exhibit a respective one of the first and one of the second hinge sections. As a result, the hinges are securely held.

In an embodiment of the present disclosure, the bearings can exhibit lead-in chamfers for the respective hinge. A lead-in chamfer is here understood as a surface inclined relative to the respective swiveling axis defined by the respective hinge. During a closing motion by the cover, the lead-in chamfers can make it easier to introduce the respective hinge into the duct of the respective bearing.

In an embodiment of the present disclosure, the translational motion of the first hinge can be blocked if the cover is located in the third position. The translational motion of the second hinge can be blocked if the cover is located in the second position. The blockages can each be lifted when the cover is located in the first position.

This ensures that the respective hinge will remain in the second position when the cover is opened. This is advantageous for a closing motion by the cover, since the cover can then be easily closed without the user having to actuate the control element once again. It can be impossible to close the cover when the respective hinge is in the first position. It may be that the respective hinge can then not be introduced into the duct of the respective bearing. In order to securely hold the cover in the first position, the blockage is lifted in this position. For example, the hinge can be exposed to a spring force, which moves the respective hinge into the first position once the blockage has been lifted.

In one embodiment of the present disclosure, the translational motion can be blocked by a respective spring leg, which a spring force holds in a groove of the control element. The spring leg can be moved out of the groove against the spring force if the cover is moved into the first position. For example, this can be done by having a portion of the base body press against a pin to which the spring leg is secured. If the spring force acts downwardly in the built-in state, for example, the pin is moved toward the top by the portion of the base body. In this way, the spring leg is moved out of the groove of the control element, and the blockage is lifted.

In an embodiment of the present disclosure, the hinges can each exhibit at least one intermediate section, which is respectively arranged between the first and second hinge section. The intermediate section can exhibit a first contact surface. The respective bearing can exhibit at least one second contact surface, which, when the cover swivels from the second or third position into the first position, comes into contact with the first contact surface and triggers a translational motion by the respective hinge into the second position. The translational motion is thus automatically triggered by the two contact surfaces while the cover is closing. As a consequence, the translational motion does not have to be blocked. For example, the second contact surface can be a laminar or pin-shaped element.

In an embodiment of the present disclosure, the hinges can each be exposed to a spring force toward the first position. The spring force can thus trigger a translational motion of the respective hinge into the first position if the respective hinge is not blocked.

One of various aspects, the present disclosure relates to a vehicle encompassing a device according to an embodiment of the present disclosure. In this case, the device can be rigidly connected with the vehicle. For example, the device can be designed as a center console armrest between front seats of the vehicle.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The present disclosure will hereinafter be described in conjunction with the following drawing figures, wherein like numerals denote like elements, and:

FIG. 8 is a schematic, detailed view of a hinge in a bearing in a second position;

FIG. 9 is a schematic, detailed view of the hinge in the bearing from FIG. 8 in a first position;

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
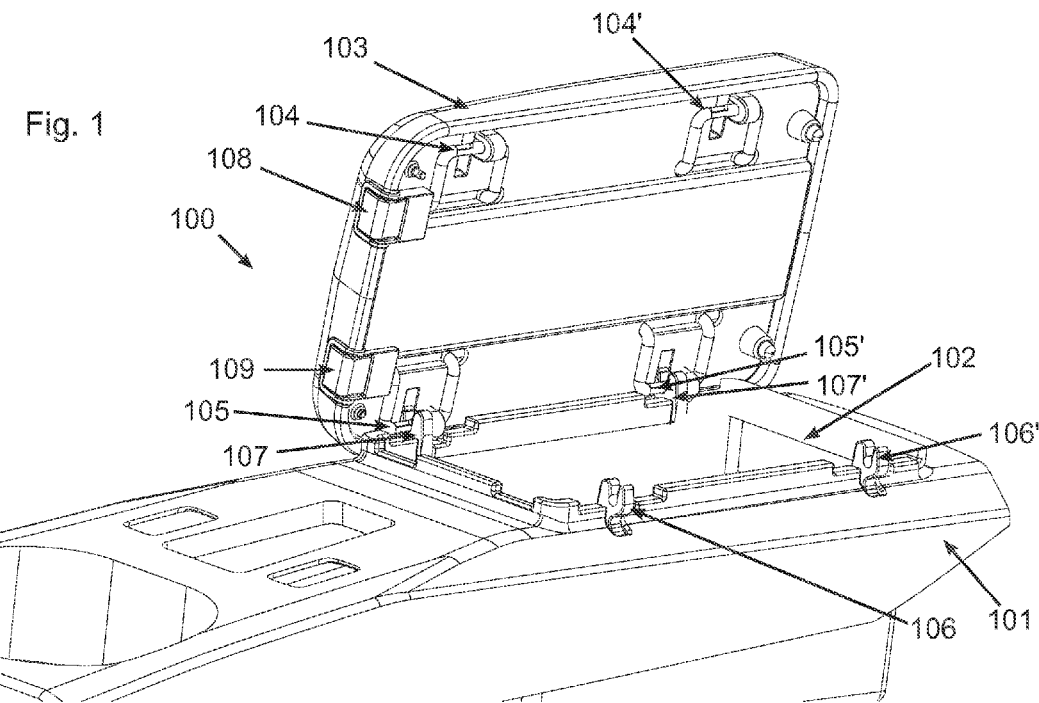
FIG. 1 is a schematic, perspective view of a device according to an embodiment of the present disclosure with a cover opened in a first direction.
Figure 2:
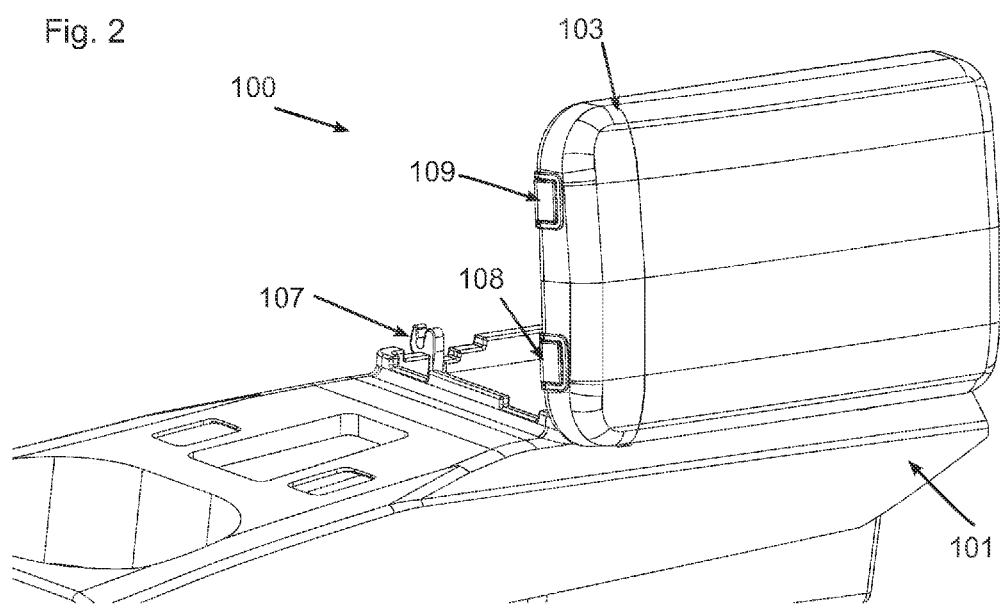
FIG. 2 is a schematic, perspective view of the device from FIG. 1, wherein the cover is opened in a second direction.
Figure 3:
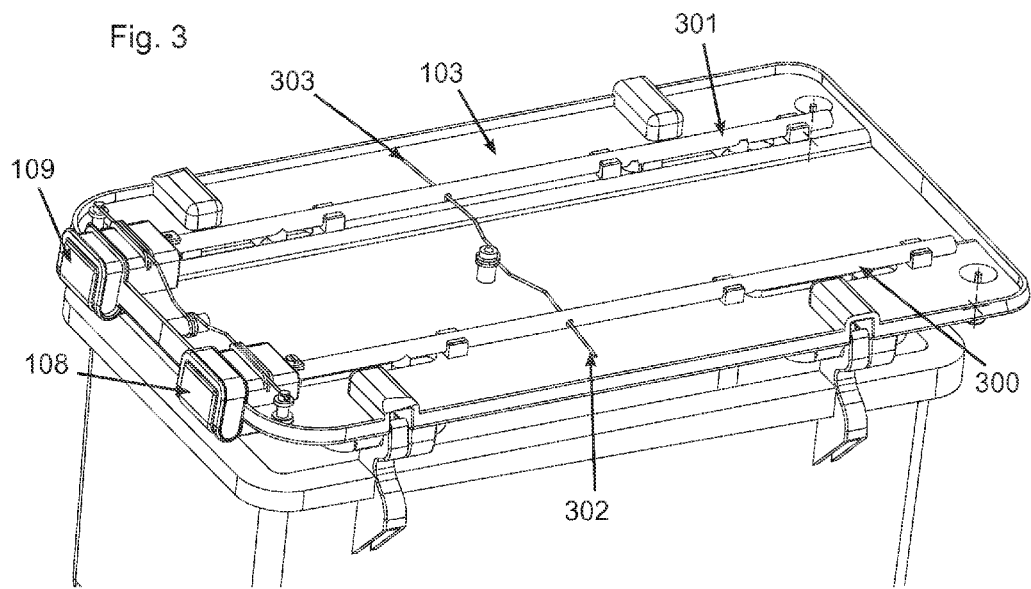
FIG. 3 is a schematic view of the device from FIG. 1 without a cladding for the cover.
Figure 4:
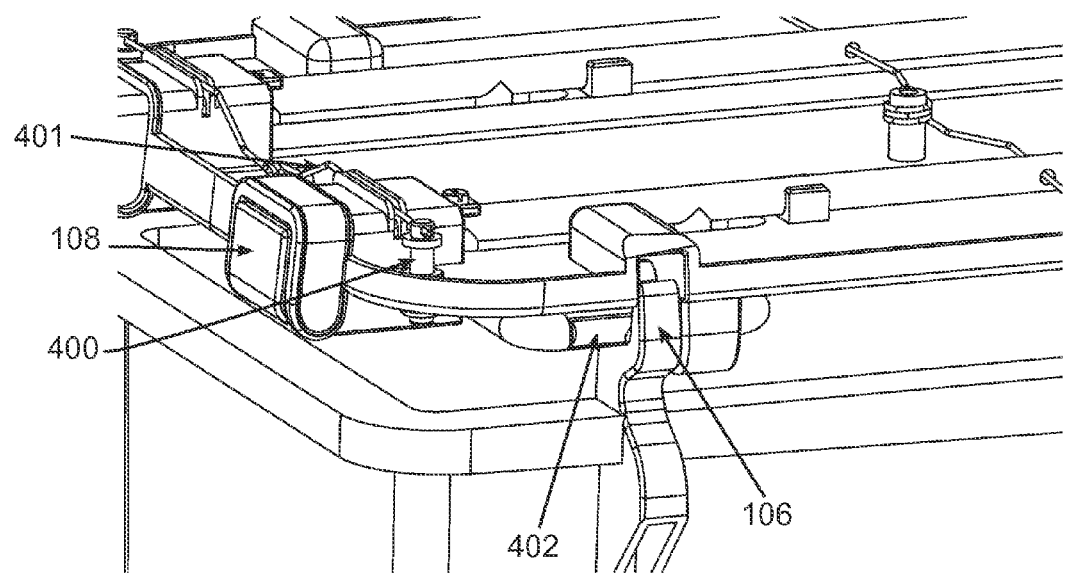
FIG. 4 is a schematic, detailed view of the device from FIG. 1.

The device 100 encompasses a base body 101 with an opening 102 and a cover 103. The cover 103 exhibits hinges 104, 104', 105 and 105'. The hinges can be held in the bearings 106, 106', 107 and 107'. For example, when the hinges 104 and 104' are held in the bearings 106 and 106', the cover 103 can be opened in a first direction by pivoting it around a swiveling axis defined by the hinges 104 and 104'. Such an opening of the cover 103 is depicted in FIG. 2. The hinges 105 and 105' are held in the bearings 107 and 107' in FIG. 1, so that the cover 103' is pivoted around another swiveling axis defined by the hinges 105 and 105'.

In addition, the cover exhibits control elements 108 and 109. The control elements 108 can be used to translationally move the hinges 104 and 104'. The control elements 109 can be used to translationally move the hinges 105 and 105' in a similar manner.

The hinges 104 and 104' are mechanically joined together via a rod 300. The rod 300 is in turn mechanically joined with the control element 108, so that, given a translational motion by the control element 108, the translational motion is transferred to the hinges 104 and 104' via the rod 300. The hinges 105 and 105' are similarly joined together via a rod 301. The rod 301 is mechanically coupled with the control element 109. A translational motion by the control element 109 is transferred to the hinges 105 and 105' via the rod 301.

Figure 5:
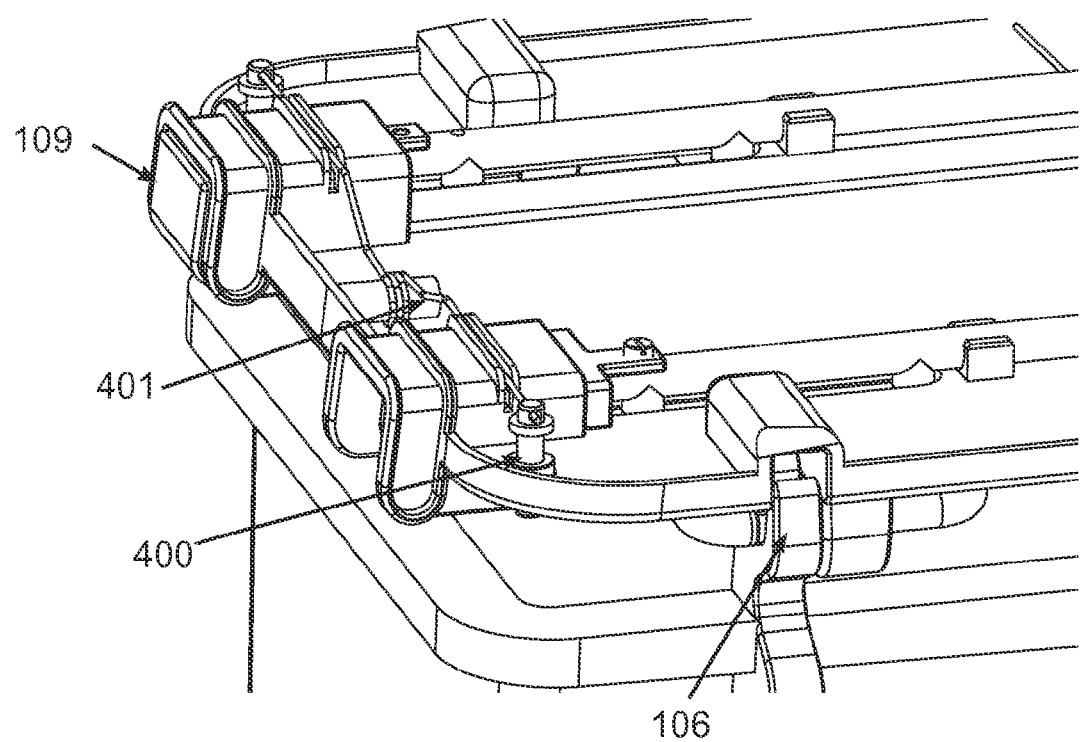
FIG. 5 is a schematic, detailed view of the device from FIG. 1, in which the hinge has been translationally moved.

The control elements 108 and 109 can thus be used to translationally move the hinges 104, 104', 105 and 105' from a first position (e.g., shown in FIGS. 1 to 4) into a second position (e.g., see FIG. 5). In the first position, the hinges 104, 104', 105 and 105' are held by the bearings 106, 106', 107 and 107'. For example, when the hinges 104 and 104' are moved into the second position, the cover 103 can swivel, thereby uncovering the opening 102 of the base body 101.

The rod 300 is mechanically coupled to a spring leg 302. The rod 301 is mechanically coupled to a spring leg 303. The spring legs 302 and 303 exert a spring force on the rods 300 and 301 that is directed opposite the actuation direction of the control elements 108 and 109. For example, if the hinges 104 and 104' are situated in the second position, they are exposed to a spring force toward the first position.

If the hinge 104 is located in the first position, a first hinge section 600 is arranged in a duct 700 of the bearing 106, so that the cover is unable to swivel around the hinges 105 and 105'. If the hinge 104 is moved into the second position, a second hinge section 402 is arranged in the duct. The cross sectional area of the second hinge section 402 is smaller than the cross sectional surface of the first hinge section 600. As a result, the hinge 104 in the second position can be upwardly removed from the bearing 106. The same holds true for the hinge 104'. This allows the cover 103 to swivel around the hinges 105 and 105'.

For the cover 103 to be able to swivel around the hinges 104 and 104', the hinges 104 and 104' must accordingly be in the first position, and the hinges 105 and 105' in the second position.

Figure 6:
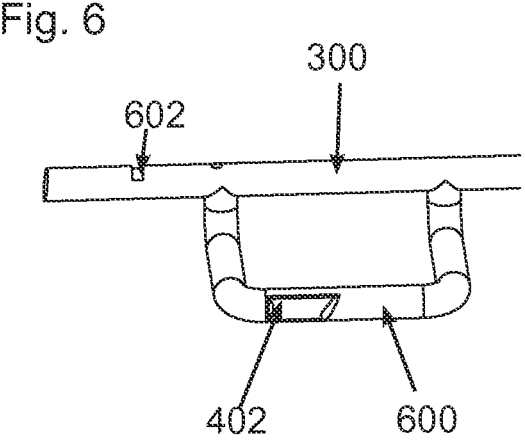
FIG. 6 is a schematic, detailed view of a hinge.

The rod 300 also exhibits a groove 602 (FIG. 6). After swiveling the cover 103 around the hinges 105 and 105' and uncovering the opening 102, a spring leg 401 engages into the groove 602. This prevents the hinges 104 and 104' from being moved back into the first position. This because the cover 103 can only be closed in this situation if the hinges 104 and 104' are situated in the second position, since the hinges 104 and 104' could otherwise not be introduced into the duct 700 of the bearings 106 and 106'.

When the cover 103 closes the opening 102, a pin 400 presses the spring arm 401 up, so that the latter is no longer arranged in the groove 602. In this way, the hinges 104 and 104' can again be translationally moved into the second position, so as to swivel the cover 103. The above statements also apply similarly to the hinges 105 and 105' and the rod 301.

Figure 7:
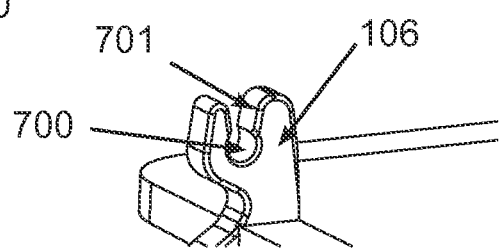
FIG. 7 is a schematic, detailed view of a bearing.
Figure 10:
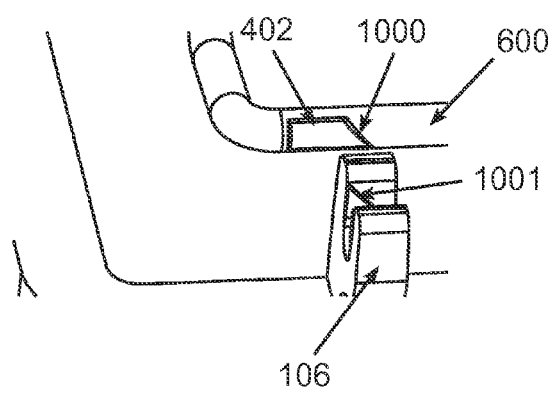
FIG. 10 is a schematic, detailed view of a hinge with a first contact surface and a bearing with a second contact surface.
Figure 11:
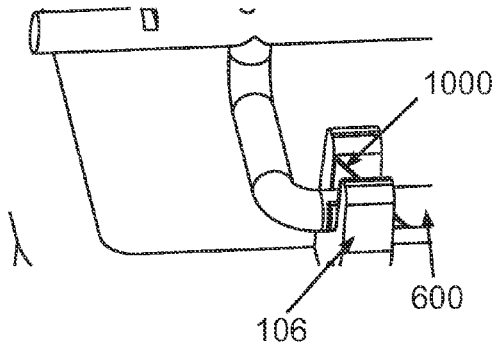
FIG. 11 is a schematic, detailed view of the hinge from FIG. 10, which was introduced into the bearing and is situated in the second position.
Figure 12:
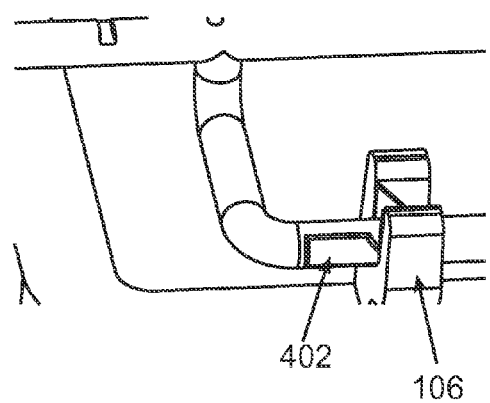
FIG. 12 is a schematic, detailed view as on FIG. 11, wherein the hinge is situated in the first position.
Figure 13:
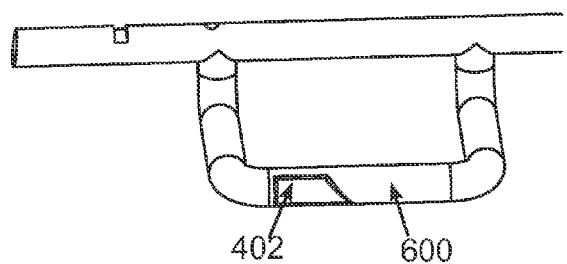
FIG. 13 is a schematic, detailed view of the hinge from FIGS. 10 to 12.

FIG. 7 shows a lead-in chamfer 701, with which the hinge 104 can be more easily introduced into the duct 700 of the bearing 106. Due to the swiveling motion of the cover 103, the hinge 104 cannot be introduced into the duct 700 directly from above. As a result, the lead-in chamfer 701 is advantageous in that it avoids mechanical tension during the process of opening and closing the cover 103.

FIGS. 10 to 13 show an embodiment of the hinges in which the pin 400, spring leg 401 and groove 602 can be omitted. The hinge 104 exhibits a first contact surface 1000 between the first hinge section 600 and the second hinge section 402. The bearing 106 exhibits a second contact surface 1001. While the cover 103 closes, the two contact surfaces 1000 and 1001 come into contact with each other. Because the contact surfaces 1000 and 1001 are inclined relative to the hinge axis, a translational motion by the hinge 104 into the second position can be triggered, and the hinge 104 can be introduced into the duct 700 of the bearing 106.

While at least one exemplary embodiment has been presented in the foregoing detailed description, it should be appreciated that a vast number of variations exist. It should also be appreciated that the exemplary embodiment is only an example, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

The invention claimed is:

1. A vehicle, comprising:
   a closable device for holding objects, the closable device including:
      a cover movable around a first hinge between a first position and a second position and movable around a second hinge between the first position and a third position, and the first hinge and second hinge are parallel to each other;
      a base body having an opening closeable by the cover, the base body including a first bearing for the first hinge, and a second bearing for the second hinge, wherein the first hinge and second hinge each include a first hinge section and a second hinge section, and a cross sectional area of the first hinge section is different than a cross sectional area of the second hinge section; and
      a third hinge and a fourth hinge, wherein the base body includes a bearing for each of the third hinge and the fourth hinge, the first hinge and the third hinge define a first swiveling axis of the cover and the second hinge and the fourth hinge define a second swiveling axis of the cover, with the first hinge, the second hinge, the third hinge and the fourth hinge held by the respective bearings of the base body.
   a third hinge and a fourth hinge, wherein the base body includes a bearing for each of the third hinge and the fourth hinge, the first hinge and the third hinge define a first swiveling axis of the cover and the second hinge and the fourth hinge define a second swiveling axis of the cover, with the first hinge, the second hinge, the third hinge and the fourth hinge held by the respective bearings of the base body.

2. The vehicle according to claim 1, wherein the first bearing and the second bearing each include a duct for the respective one of the first hinge and the second hinge, and a cross sectional area of the duct corresponds to the cross sectional area of the first hinge section.

3. The vehicle according to claim 2, wherein the cross sectional area of the second hinge section enables the respective one of the first hinge and the second hinge to be removed from the respective one of the first bearing and the second bearing.

4. The vehicle according to claim 2, wherein the cover includes a first control element and a second control element, and the first control element is associated with the first hinge, and the second control element is associated with the second hinge.

5. The vehicle according to claim 4, wherein the first control element is used to translationally move the first hinge between a first position and a second position and the second control element is used to translationally move the second hinge between a first position and a second position.

6. The vehicle according to claim 5, wherein the first hinge section is arranged in the duct of one of the first bearing and the second bearing in the first position.

7. The vehicle according to claim 5, wherein the second hinge section is arranged in the duct of one of the first bearing and the second bearing in the second position.

8. The vehicle according to claim 1, wherein the first hinge and the second hinge are parallel to each other.

9. The vehicle according to claim 1, wherein the cover closes the opening in the first position, and the cover uncovers the opening in the second position and the third position.

10. The vehicle according to claim 1, wherein each of the first hinge, the second hinge, the third hinge and the fourth hinge each include one of the first hinge sections and one of the second hinge sections.

11. The vehicle according to claim 1, wherein each of the bearings of the base body include lead-in chamfers for the respective one of the first hinge, the second hinge, the third hinge and the fourth hinge.

12. The vehicle according to claim 5, wherein the translational motion by the first hinge is blocked with the cover in the third position, the translational motion of the second hinge is blocked with the cover in the second position, and the blockages are each lifted with the cover in the first position.

13. The vehicle according to claim 12, wherein the translational motion is blocked by a spring leg, which a spring force holds in a groove of the first control element, and the spring leg is moved out of the groove against the spring force if the cover is moved into the first position.

14. The vehicle according to claim 1, wherein the first hinge, the second hinge, the third hinge and the fourth hinge each include at least one intermediate section, which is respectively arranged between the first hinge section and the second hinge section of each of the first hinge, the second hinge, the third hinge and the fourth hinge, and the intermediate section includes a first contact surface and the respective bearing of the base body includes at least one second contact surface, which, when the cover moves from the second position or the third position into the first position, comes into contact with the first contact surface and triggers a translational motion by the respective one of the first hinge, the second hinge, the third hinge and the fourth hinge into the second position.

15. The vehicle according to claim 1, wherein the first hinge, the second hinge, the third hinge and the fourth hinge are each exposed to a spring force toward the first position.

16. The vehicle according to claim 1, wherein the first hinge and the third hinge are mechanically coupled together, and the second hinge and the fourth hinge are mechanically coupled together.

* * * * *